W. L. SLIMP.
TRACTION ENGINE FRAME AND STEERING DEVICE.
APPLICATION FILED JULY 15, 1910.
993,893.
Patented May 30, 1911.
2 SHEETS—SHEET 1.
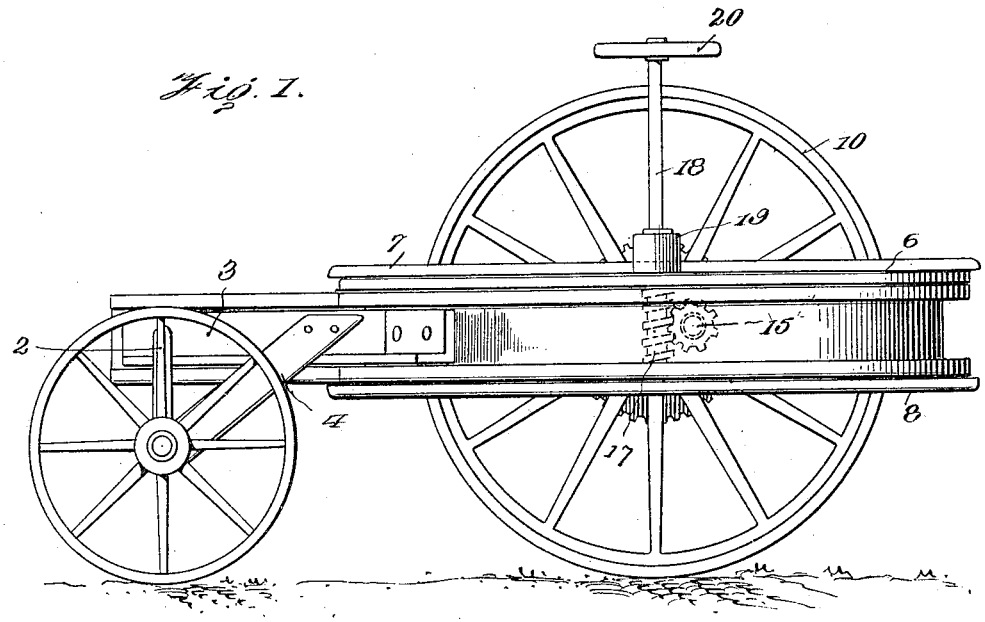
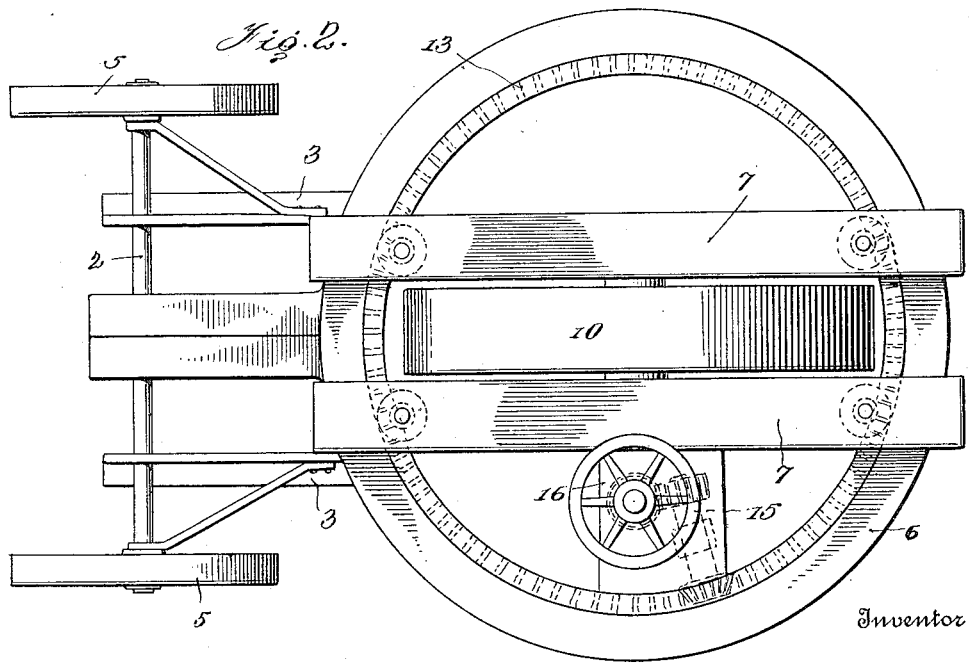

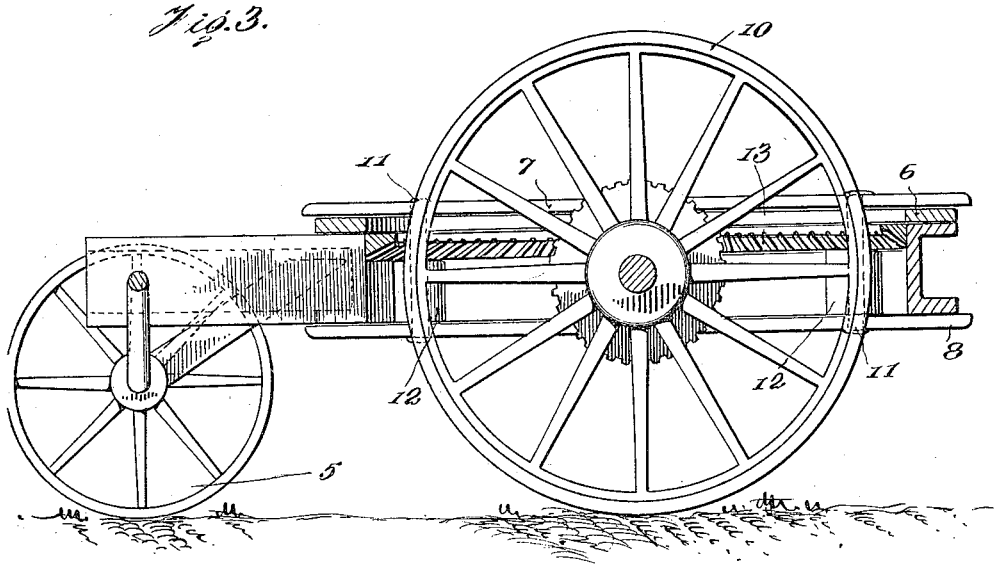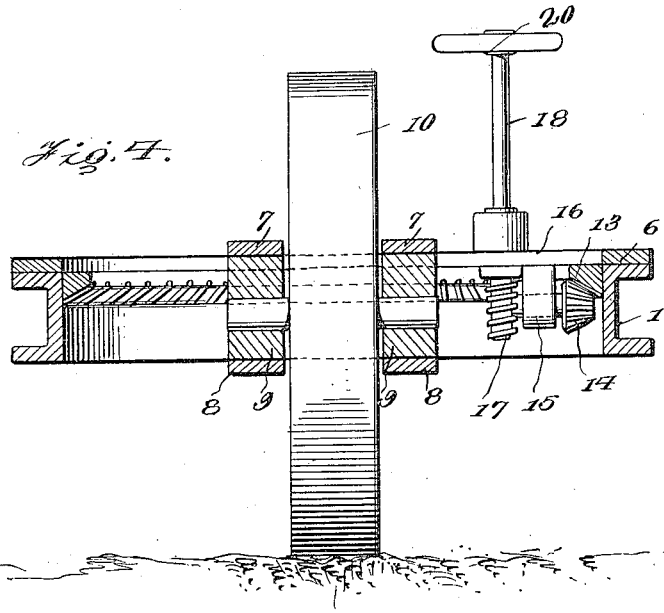

UNITED STATES PATENT OFFICE.

WILLIAM L. SLIMP, OF PANHANDLE, TEXAS.

TRACTION-ENGINE FRAME AND STEERING DEVICE.

993,893.

Specification of Letters Patent.  Patented May 30, 1911.

Application filed July 15, 1910. Serial No. 572,194.

*To all whom it may concern:*

Be it known that I, WILLIAM L. SLIMP, a citizen of the United States, residing at Panhandle, in the county of Carson and State of Texas, have invented certain new and useful Improvements in Traction-Engine Frames and Steering Devices; and I do hereby declare the following to be a full, clear, and exact description of the invention, such as will enable others skilled in the art to which it appertains to make and use the same.

The present invention relates to an improved frame and steering device for traction engines, road locomotives, and the like, and has for its object to provide a device of this character embodying novel features of construction whereby the engine can be guided through the medium of a traction wheel.

A further object of the invention is the provision of a frame and steering device of the character above mentioned which is strong and durable in its construction, which comprises few and simple parts, and which will enable one of the drive wheels to be readily turned for steering the engine.

With these and other objects in view, the invention consists in certain combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a frame and steering device for traction engines constructed in accordance with the invention. Fig. 2 is a plan view of the same. Fig. 3 is a vertical longitudinal sectional view, and Fig. 4 is a transverse vertical sectional view.

Corresponding and like parts are referred to in the following description and indicated in all the views of the drawing by the same reference characters.

Specifically describing the present embodiment of the invention, the numeral 1 designates a circular frame which is shown as formed by bending a strip of channel iron, the ends of the said strip of channel iron being extended outwardly and engaging the middle portion of an arch 2. Arms 3 of angle iron or other suitable material project from the circular frame 1 upon opposite sides of the ends of the channel iron and also engage the arch 2, the downwardly extending sides of the arch being connected to the arms 3 by suitable braces 4 and having the wheels 5 journaled thereon, the said wheels merely serving to balance the frame. A ring 6 is rotatably mounted upon the top of the circular frame 1. A pair of spaced cross bars 7 extend across the ring 6 at the top of the circular frame 1, while a corresponding set of cross bars 8 extend across the circular frame 1 at the bottom thereof, the ends of the said cross bars extending over the edges of the circular frame 1 at the top and bottom thereof respectively. The middle portions of the upper cross bars 7 are connected to the corresponding lower cross bars 8 by means of the bearing blocks 9 between which a drive wheel 10 is journaled, the said drive wheel being received between the spaced cross bars 7 and 8 and serving as the main support for the engine. Power may be transmitted to this drive wheel 10 in any suitable manner.

The end portions of the upper cross bars 7 are connected to the end portions of the corresponding lower cross bars 8 by means of the bolts 11 upon which the wheels 12 are journaled, the said wheels engaging the interior of the circular frame 1 so as to reduce the friction and enable the ring 6 and cross bars 7 and 8 to be turned freely with respect to the circular frame. It will be apparent that the drive wheel 10 will be also also turned with the ring 6 and parts carried thereby, thereby admitting of the engine being steered through the medium of the drive wheel.

A rack 13 extends around the interior of the circular frame 1 and is engaged by a beveled gear wheel 14 on the end of a short shaft 15 which is jorunaled in bearings pendent from a bar 16 connecting the ring 6 and one of the upper cross bars 7. The inner end of this horizontal shaft 15 is connected by the worm gearing 17 to a vertical shaft 18 which is journaled within the bearings 19 and is provided at its upper end with a crank portion 20. With this construction, it will be obvious that by turning the vertical shaft 18 through the medium of the crank 20, the ring of plate 6 and all parts carried thereby will be turned with respect to the circular frame. A very simple means is thereby provided whereby the traction engine or other similar device embodying the invention can be steered through the medium of one of the traction wheels.

Having thus described the invention, what I claim as new and desire to secure by Letters Patent, is:—

In a device of the character described the combination with a circular frame of a ring revolubly mounted thereon, spaced cross bars extending across the upper face of the ring, bearing blocks secured to the cross bars, cross bars corresponding to the first mentioned cross bars and connected to the lower faces of the bearing blocks and extending across the circular frame, anti-friction rollers arranged between the end portions of the corresponding cross bars and engaging the interior of the circular frame, a traction wheel journaled in the bearing blocks, a rack within the circular frame, a shaft journaled upon the ring, a pinion fastened on the said shaft and engaging the rack, a worm-wheel mounted upon the shaft, a vertical rod journaled in the ring and carrying a worm adapted to mesh with the said worm-wheel, and a hand wheel on the upper end of this rod, whereby the rod may be rotated for the purpose of turning the ring with respect to the circular frame, substantially as and for the purposes set forth.

In testimony whereof I affix my signature in presence of two witnesses.

WILLIAM L. SLIMP.

Witnesses:
J. SID O'KEEFE,
JOE ROREX.

---

Copies of this patent may be obtained for five cents each, by addressing the "Commissioner of Patents, Washington, D. C."